United States Patent [19]

Gleave et al.

[11] Patent Number: 4,734,242

[45] Date of Patent: Mar. 29, 1988

[54] METHODS FOR PRODUCING PLASTIC MOLDED ARTICLES

[75] Inventors: Donald R. Gleave; Nigel F. Gamble, both of Leicester, United Kingdom

[73] Assignee: Donald Rowland Gleave and Silkjet Limited, Leicester, England

[21] Appl. No.: 871,100

[22] Filed: Jun. 5, 1986

[51] Int. Cl.[4] ....................... B29C 45/33; B29C 45/36; B29C 45/44

[52] U.S. Cl. ....................................... 264/318; 249/63; 249/66 R; 264/334

[58] Field of Search .................. 264/318, 328.7, 328.8, 264/328.12, 230, 339, 334; 425/DIG. 58, 557, 556, 577, 438; 249/66 R, 63

[56] References Cited

U.S. PATENT DOCUMENTS

| | | | |
|---|---|---|---|
| 1,865,241 | 6/1932 | Dock | 224/276 X |
| 2,167,731 | 8/1939 | Swanstrom | 224/276 X |
| 2,663,576 | 12/1953 | Berman | 224/276 X |
| 3,193,884 | 7/1965 | Haynie et al. | 425/DIG. 58 X |
| 3,293,697 | 12/1966 | Balint | 264/318 X |
| 4,166,559 | 9/1979 | Richardson | 224/276 |
| 4,209,485 | 6/1980 | Greenspan | 264/318 X |

*Primary Examiner*—Jan H. Silbaugh
*Assistant Examiner*—Karen D. Kutach

[57] ABSTRACT

A clipboard 2 with a board portion 4 has a pair of rearward projections 6, on either side of a clip for retaining paper 10, for enabling the clipboard 2 to be supported on and retained by a steering wheel 9.

2 Claims, 9 Drawing Figures

METHODS FOR PRODUCING PLASTIC MOLDED ARTICLES

DESCRIPTION

The invention relates to plastic moulded articles such as for example clipboards and to a method for producing the same.

Known clipboards have to be supported on a flat surface or by the writer. Most clipboards are assembled from a number of components. It is amongst the purposes of the invention to provide a simpler clipboard more convenient to use and to provide a simple method of manufacture. The basic configuration and method of production may be applied to other articles.

The invention provides firstly a clipboard having rearward projecting means to enable the clipboard to be supported on and retained by a vehicle steering wheel. The clipboard can thus be used easily in the confined interior space of a car. Previously clipboards could only be used with some difficulty. The invention is based on the appreciation that by a minor modification, clipboards can be made much more easy to use inside vehicles.

Preferably a top edge of the clipboard has a pair of rearward inclined flanges on either side of a clip at the front of the clipboard. The resulting clipboard has a pleasing appearance, can be carried easily and can also be supported on a flat surface.

Advantageously the board and flanges are moulded integrally from a plastic material and the flanges approximate in plan the steering wheel curvature. The clipboard need not match the steering wheel precisely as long as the flanges provided two sideways spaced supports at the top edge.

Preferably also the clip is integrally moulded forming a lip for engaging a top surface at the front of the clipboard. A hole in a board portion can be used to press the clip away to allow paper to be inserted.

The invention thirdly provides a method of producing a moulded article with an integrally moulded clip which method includes:

A. bringing together a first mould for forming one side of the moulded article, a second mould for forming the other side of the moulded article and a third mould received partly in the second mould and having a projecting part for lying intermediate the first and second mould for forming a clip portion;

B. injecting plastic material into a mould cavity formed between the respective moulds to forming the moulded article the article so formed having a curved connecting portion to bring the clip portion into a facing relationship with a clamping surface;

C. separating the first and second mould and causing the third mould to be projected outwards of the second mould to thereby cause outer surface of the curved connecting portion to be fully exposed; and D. sliding the moulded article transversely between the moulds to slide the clip portion and the facing clamping surface off the projecting part of the third mould, the clamping surface portion and clip portion being urged towards on another by relaxation of the moulded material after removal.

Preferably the first mould has at least one projection for forming a hole in the clamping surface and the third mould has at least one blind hole for forming projecting means for entering the hole in the clamping surface upon removal of the moulded article.

The invention provides thirdly a moulded article having an integrally moulded clip portion facing a clamping surface portion with projecting means on one portion extending into holes in the other portion.

DRAWINGS

SPECIFIC DESCRIPTION

Figure 1:
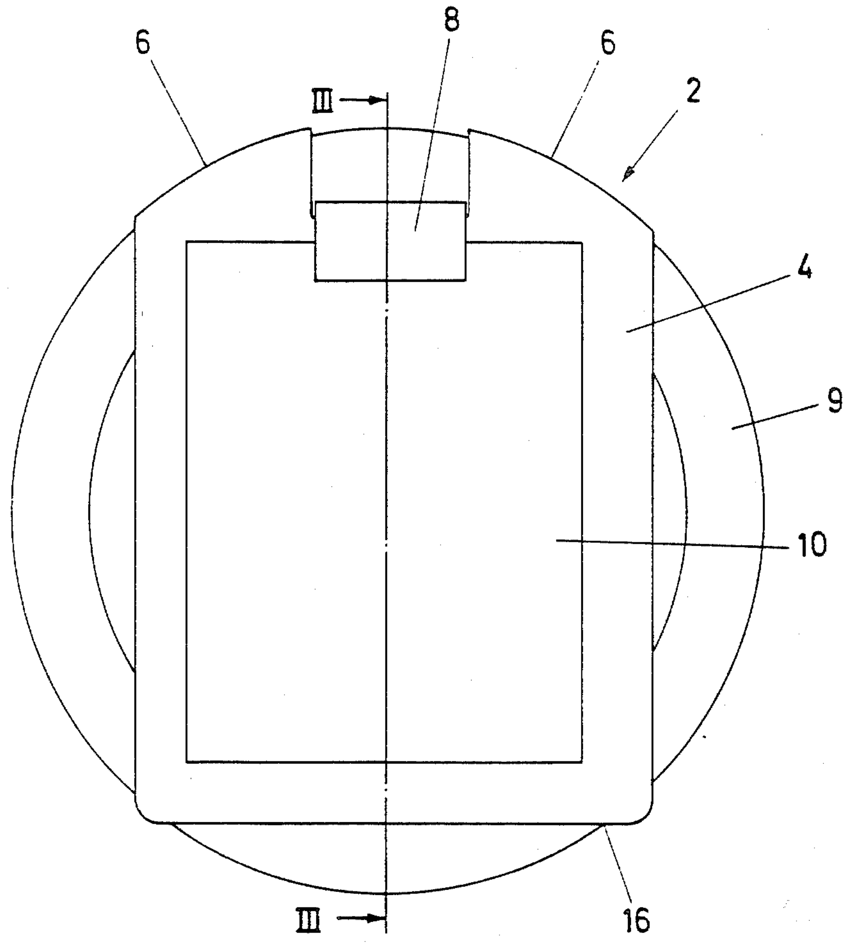
FIG. 1 shows a front view of a clipboard of the invention supported on a vehicle steering wheel.
Figure 2:
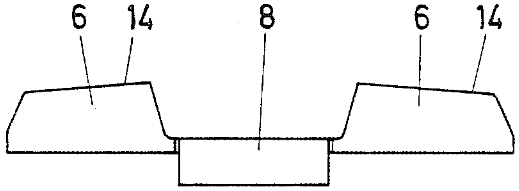
FIG. 2 is a top view of the clipboard of FIG. 1.
Figure 3:
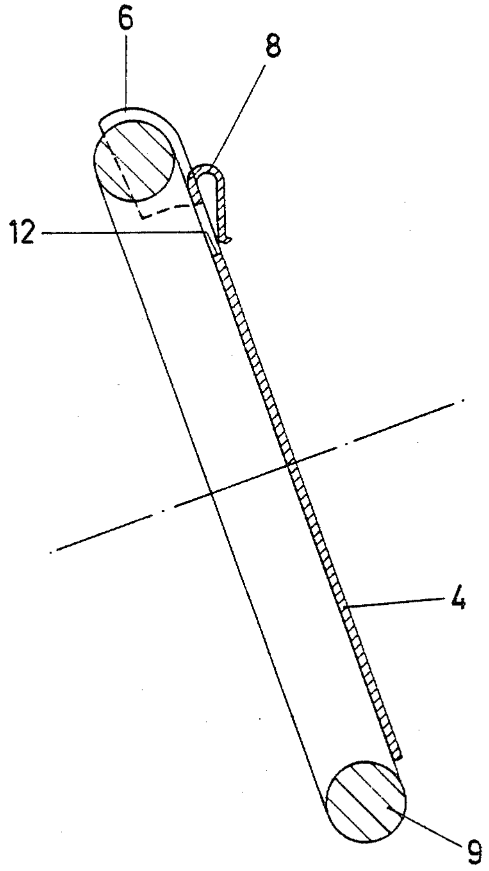
FIG. 3 is a section along line III—III in FIG. 1.
Figure 4:
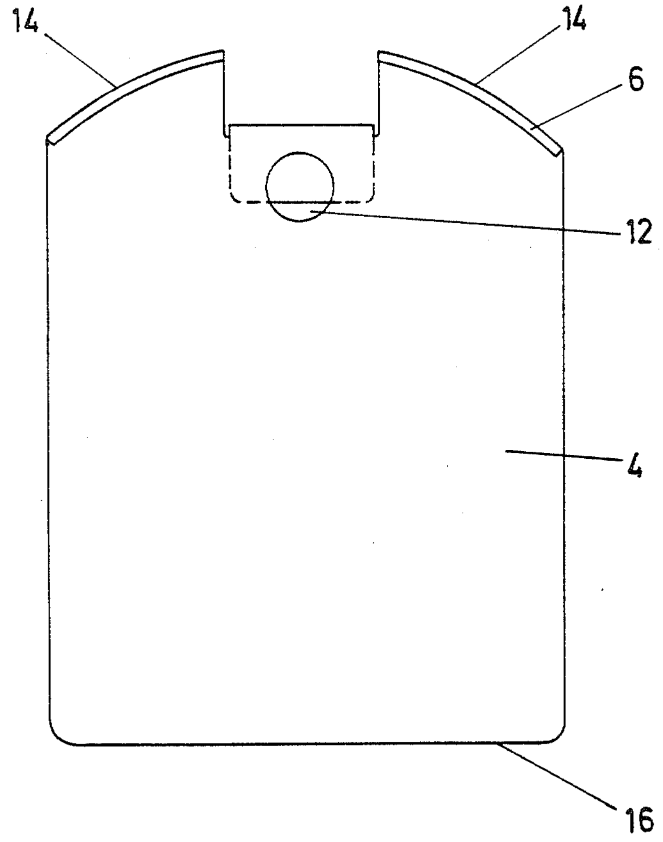
FIG. 4 is a rear view of the clipboard of FIG. 1.

In one embodiment described with reference to FIGS. 1 to 4, a clipboard 2 shaped by hot-forming from a single plastics sheet or is moulded integrally of plastics material. The clipboard 2 provides a board portion 4, a pair of rearward projections 6, and, in between the projetions 6, a clip 8 for holding paper 10 on the board. The projections 6 are angled or curved to follow the outline of a steering wheel 9. The shape is generally selected to suit a larger style steering wheel as the clipboard 2 can be supported in a stable manner on smaller steering wheels. The clip 8 is biassed resiliently onto the board portion. A hole 12 permits the clip to be lifted off from the rear. The rear most edge 14 of the projections 10 lie in one plane with the bottom edge 16 of the board porion 4 to enable the unit to rest stably on a flat surface.

In another embodiment described with reference to FIGS. 5 and 6, the clip 8 has rearward projections 20 into a pair of holes 22 in the portion 4 so as to facilitate gripping of the paper. The clipboard 2 can then be moulded using a top mould 26 and bottom mould 28 having a split line 30. The top mould mounts pins 32 forming the holes 22. The bottom mould 28 has an insert 34 with a recess 36. The moulded clipboard is extracted by pushing the board in the direction of arrow A causing the clip 8 to slide over insert portion 38 after the bottom mould 28 has been removed.

The clipboard 2 is easy to produce, can be used conveniently in a car and can be carried by hand.

A pen clip may be provided additionally.

In another embodiment, the clip 8 is omitted and a conventional metal clip is welded or rivetted in its place.

Figure 5:
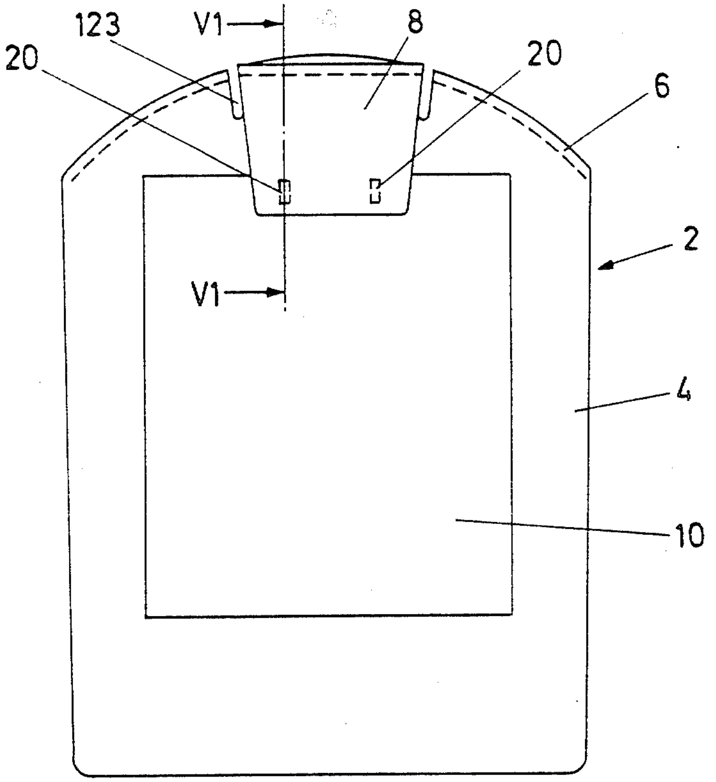
FIG. 5 is a front view of another clipboard of the invention.
Figure 6:
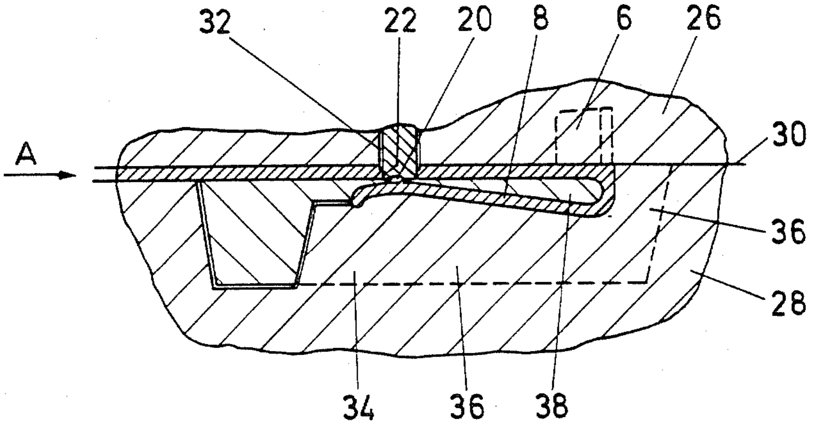
FIG. 6 is a section along line VI—VI of a clipboard of FIG. 5 in its mould.
Figure 7:
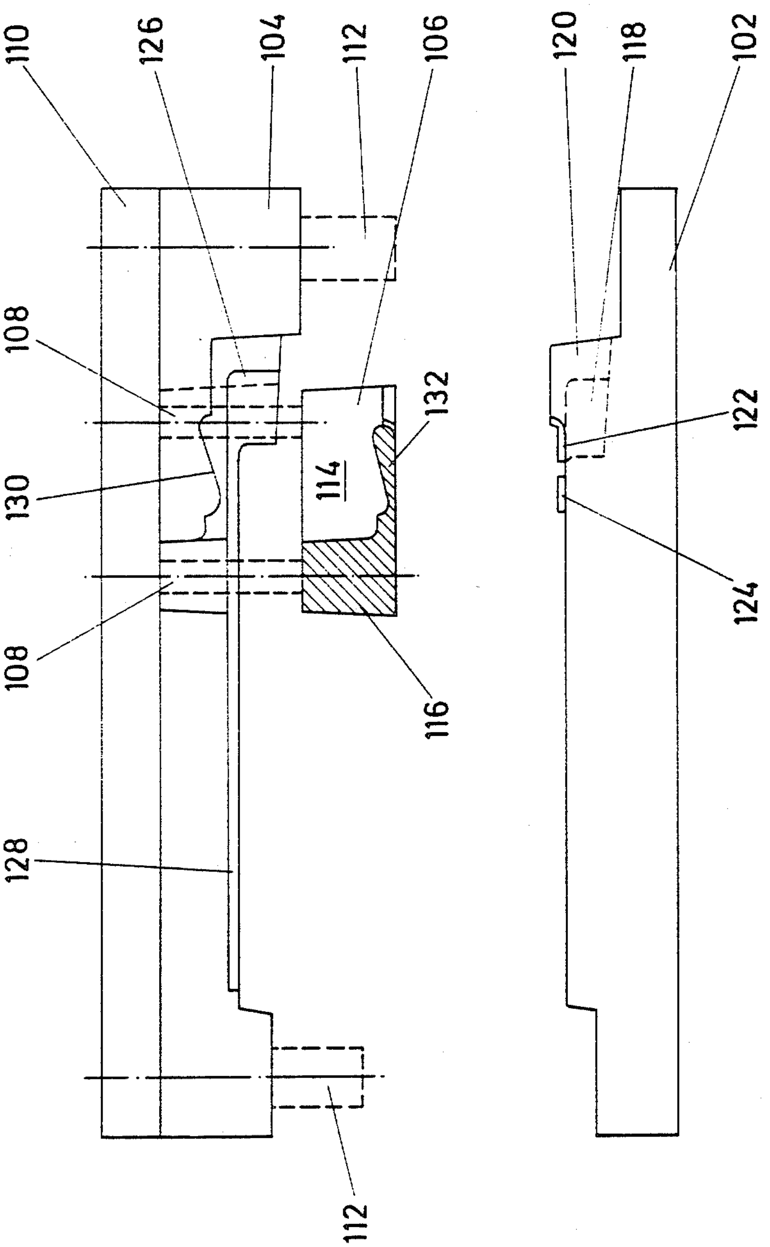
FIG. 7 is a section through another separated moulding arrangement for producing a clipboard of the invention seen from above.
Figure 8:
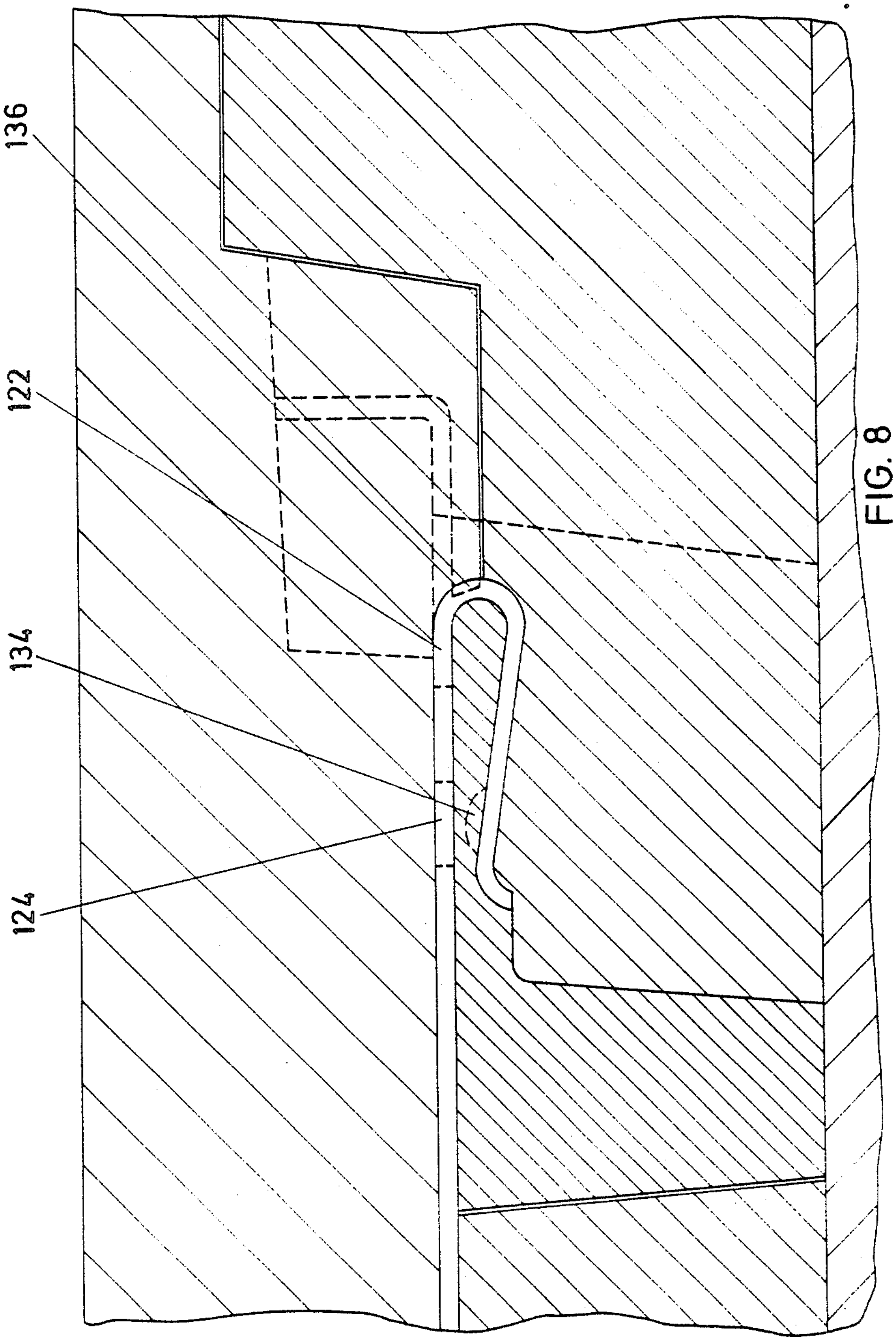
FIG. 8 is an enlarged view seen from below, of part of the moulding arrangement of FIG. 7 brought together.
Figure 9:
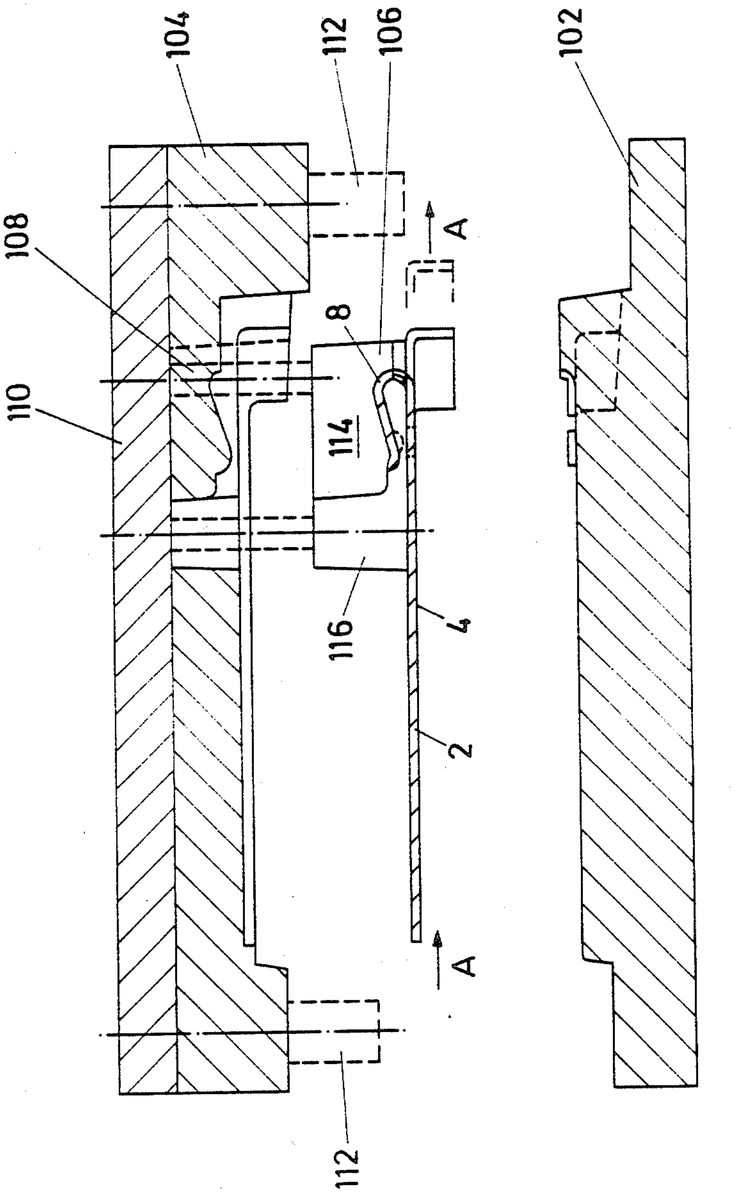
FIG. 9 is a section similar to FIG. 7 illustrating removal of the moulded article.

With reference to FIGS. 7 to 9, a moulding arrangement for producing a clipboard substantially as shown in Figure 5 of the Specification includes a first mould 102, a second mould 104 and a third mould 106 which is received or can be projected from a corresponding recess in the mould 104. The mould 106 has a pair of spaced side portions 114 and a transversely connecting portion 116 shown in sectional lines in FIG. 7. The third mould 106 is mounted by studs 108 onto a plate 110 at the rear of the mould 104. The plate 110 in turn carries studs 112 to abutting the mould 102. Thus when the moulds 102, 104, 106 are brought together in use, the mould 102 pushes the studs 112 and thereby causes the mould 106 to be located in the position shown in FIG. 8 appropriately positioned between the moulds 102 and 104.

The mould 102 has outer walls shown at 118 for forming the inward facing surface of the clipboard and has, intermediate the respective surfaces 118, a projecting head 120 for forming part of the outer curvature of the moulded article connecting the clip 8 to the board portion 4. The mould 102 also has ridges 122 for helping to form the recesses 123 on either side of the clip 8 (see FIG. 5) and a pair of transversely spaced projections 124 for forming an elongate apperture in the board portion 4 for reasons to be explained later.

The second mould 104 has inner surface 126 for forming the outer surfaces of the rearward projection 6 of the clipboard. The mould 104 also forms a recess 128 for forming the bulk of the body portion 4. A recess in the mould 104 is specially shaped at 130 so as to form the outer surface of the clip 8 whilst the sides 114 of the third mould 106 define the edges of the clip.

The details of the third mould 106 can be seen most readily in FIG. 8. The interconnecting portion 116 has a projecting part 132 which lies, when the moulds are brought together, in between the mould 102 and 104. The projecting part 132 is formed with a pair of transversely spaced blind holes which can be seen to lie in proximity to the projections 124 but the outer surface of the projecting part 132 abuts the upper edge of the projections 124. The projecting ridges 122 define the sides of the clip portion 8 in such a way that the curved part 136 is kept separate from the remainder of the space formed between the moulds so as to permit the clip 8 in the finished product to be flexed readily for clamping paper.

As the moulds 102, 104 and 106 are brought together the studs 112 cause the mould 106 to take up the position illustrated in FIG. 8. Next plastic material is injected into the space formed between the moulds and shortly thereafter the moulds can be separated to give the position shown, with slight exaggeration, in FIG. 9. The clipboard 2 is locked onto the projecting part 132 of the mould 106, being held in position by the clip 8 and the projections moulded in the blind holes 134. The board portion 4 and clip portion 8 converge towards another. The operative next pushes the clipboard 2 in the direction shown by arrows A to the position shown schematically in dotted lines. As a result the clip 8 will be bent away from the board portion 4 so as to permit the clipboard 2 to be separated from the now projecting third mould 106. After removal the clip 8 is urged onto the board portion 4 by virtue of the relaxation of the curved part which interconnects the clip 8 with the board portion 4. The curvature can be selected to give the appropriate clamping effect. In so doing the rearward projections 20 formed by the blind holes 134 will enter the elongate holes 22 formed by the projections 124.

Using the method of moulding described before it is possible to produce a clipboard having flanges of rearward projections 6 for securing to a steering wheel in a single moulding operation, whilst at the same time forming a clip 8 capable by means of the projections 20 of firmly engaging a piece of sheet material on the board portion 4. The method of manufacture is quick and uses relatively little plastics material. The resulting clipboard is effective yet can be easily sterilised for use, for example, in hospitals and contains no metal parts, for use, for example in applications where low magnetic fields have to be measured.

The method of the invention permits surprisingly the production of an article by injection moulding having portions which interdigitate and lie closely against each other.

The moulding technique described may be used for products other than clipboards in which it is desired for a clip to engage a sheet material. The clip 8 is deformed in one sense to release it from, the mould 106 but relaxes in the other sense so as to bring it to its operative position.

As shown in FIGS. 7 to 9 the curved clip part is arranged substantially level with the lower ends of the rearward projections 20 so that the curved clip part lies well inside the steering wheel rim in use and does not interfere with the rim.

We claim:

1. A method of molding a clipboard having a flat board portion and having an integrally formed resilient U-shaped clip portion, said method comprising the following steps:
   (a) providing first and second mold parts that define, respectively, portions of the rear and front planar surfaces of the flat board portion,
   (b) locating a third mold part on sturds provided in said second mold part, such third mold part defining a forwardly facing surface of the rear leg of the U-shaped clip portion and a rearwardly facing surface of the front leg of the U-shaped clip portion, which clip portion surfaces diverge toward the base of the U-shaped clip portion, and the base having outer and inner surfaces defined by the first and second mold parts, and third mold part respectively,
   (c) mating said mold parts to form a cavity for the clipboard, the first and second mold parts also defining rear and front facing surfaces of said rear and front legs of said U-shaped portion respectively,
   (d) injecting plastic material into the mold cavity so formed,
   (e) separating the first and second mold parts so that the molded clipboard itself moves the third mold part away from the second mold part on the studs provided,
   (f) forcibly sliding the molded clipboard in a direction parallel the plane of the board to separate it from the third mold part by elastically deforming the clip portion toward an open condition, said clipboard assuming a relaxed closed condition after being so separated from the third mold part.

2. The method according to claim 1 further characterized by the additional step of providing means in said first mold part for forming at least two spaced apart holes in the rear leg of the clip portion adjacent the free end portion of the front leg of said clip portion and providing indentations in the third mold part to create projections in the rearwardly facing surface of the front leg of the U-shaped clip portion aligned with these holes so provided in the rear leg of said U-shaped clip portion.

* * * * *